(12) United States Patent
Sanderson

(10) Patent No.: US 6,242,717 B1
(45) Date of Patent: Jun. 5, 2001

(54) REMOVABLE REFLECTOR RACK FOR AN ULTRAVIOLET CURING OVEN

(75) Inventor: Terry M. Sanderson, Tucson, AZ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/385,804

(22) Filed: Aug. 30, 1999

(51) Int. Cl.[7] .................. F27B 9/36; F21V 7/10; F27D 11/02
(52) U.S. Cl. ............ 219/405; 219/388; 250/504 R; 250/492.1; 392/424
(58) Field of Search .................. 219/388, 405, 219/411; 392/417, 420, 421, 423, 424; 250/504 R, 492.1, 492.3; 362/297, 298, 302, 370; 65/425, 509, 529

(56) References Cited

U.S. PATENT DOCUMENTS

| | | | |
|---|---|---|---|
| 4,015,340 | * | 4/1977 | Treleven ............. 250/504 R |
| 4,591,724 | * | 5/1986 | Fuse et al. .......... 250/492.1 |
| 4,710,638 | * | 12/1987 | Wood ................. 250/492.1 |
| 5,294,260 | * | 3/1994 | Larsen-Moss et al. .. 118/620 |
| 5,726,815 | * | 3/1998 | Gunter et al. ........ 250/492.1 |
| 5,861,633 | * | 1/1999 | Mandellos ........... 250/504 R |
| 5,973,331 | * | 10/1999 | Stevens et al. ....... 250/492.1 |

* cited by examiner

Primary Examiner—Joseph Pelham
(74) Attorney, Agent, or Firm—Thomas, Kayden, Horstemeyer & Risley, LLP

(57) ABSTRACT

A removable rack for supporting a reflector in an oven having a light source where the reflector focuses light emitted from the light source in a predetermined manner. The preferred removable rack is arranged and configured to support a mirror array therein where the entire rack can be removably fixed to the interior of the oven in which it will be used. The rack is preferably arranged and configured to releasably engage the mirror array therein. A method for replacing a reflector disposed in the internal portion of an oven having a light source comprising the steps of providing a removable support rack for releasably supporting the reflector removably fixed to an interior portion of an oven. A reflector can be replaced by removing a member, fixing the removable support rack to the interior portion of the oven and removing the removable support rack from the interior of the oven. The rack and the mirror arrays supported thereon can be removed from the oven collectively by disengaging fixing members fixing the rack to the oven interior. The mirrors can then be removed from the rack by disengaging a support portion of the rack, thereby releasing the mirrors.

16 Claims, 5 Drawing Sheets

REMOVABLE REFLECTOR RACK FOR AN ULTRAVIOLET CURING OVEN

FIELD OF THE INVENTION

This invention relates to curing ovens and, more particularly, to an ultraviolet curing oven for curing optical fiber coatings.

BACKGROUND OF THE INVENTION

Ultraviolet curing ovens are used to cure optical fiber coatings, inks, and fiber ribbon cables, as well as many other materials in modem manufacturing, such as in the electronics manufacturing industry. More specifically, curing of optical fiber coatings is highly important to the performance of the fibers in light wave communication systems. The successful implementation of a light wave communication system requires high quality light guide fibers having mechanical properties sufficient to withstand the stresses to which they are subjected. Each fiber must be capable of withstanding along its entire length a maximum stress level to which the fiber will be exposed during installation and service. The importance of fiber strength becomes apparent when one considers that a single fiber failure will result in the loss of several hundreds of communication circuits.

The failure of light guide fibers in tension is commonly associated with surface flaws which cause stress concentrations and lower the tensile strength below that of a fiber of pristine unflawed glass. The size of the flaw determines the level of stress concentration and, hence, the failure stress. Even micron-sized surface flaws cause stress concentrations which significantly reduce the tensile strength of the fibers.

Long lengths of light guide fibers have considerable potential strength, but the strength is realized only if the fiber is protected with a layer of a coating material such as, for example, a polymer, soon after it has been drawn from a preform. This coating serves to prevent airborne particles from impinging upon and adhering to the surface of the drawn fiber, which would weaken it or even affect its transmission properties. Also, the coating shields the fibers from surface abrasion, which could occur as a result of subsequent manufacturing processes and handling during installation. The coating also provides protection from corrosive environments and spaces or separates the fibers in cable structures.

Light guide fibers are usually coated during a wet-coating process which typically involves drawing the light guide fiber through a reservoir of a liquid polymer material and then curing the liquid polymer material to harden it by exposing it to curing radiation (e.g., ultraviolet light). Ultraviolet curing ovens are commonly used in this type of process.

Such ovens typically include at least one ultraviolet bulb and a plurality of elliptical or parabolic reflectors, such as mirrors. The mirrors focus light emitted from an ultraviolet bulb onto the product to be cured. Commonly known ultraviolet ovens implement mirror segments which are generally several inches wide, and may comprise either a glass or metal substrate. These mirror substrates include reflective coatings disposed thereon, wherein the reflective surfaces provide specular reflections. Typically, several of these mirror segments are mounted in the oven to create a mirror array.

In as much as the ultraviolet bulb in a curing oven generates a substantial amount of heat, the oven must be cooled during use to prevent damage to the internal components of the oven. It is typically economically undesirable to filter the cooling air in industrial settings, and failure to do so results in dust and other contaminants depositing on the reflective surfaces of the mirrors through time, thereby reducing the specular reflectivity of the mirrors. As a result of the reduced specular reflectivity, the mirrors do not properly focus the ultraviolet light emitted from the bulb onto the product to be cured, thus mirrors used in such ultraviolet ovens must be cleaned and/or replaced periodically. Since the oven is out of commission during such maintenance, it is desirable to have the ability to remove and replace the mirrors easily and quickly in ultraviolet ovens, thereby reducing down time.

The removal and/or replacement process in known ultraviolet ovens implementing an array of removable mirrors is a laborious, time consuming task. The mirrors are typically fixed to the interior of the oven with dozens of small machine screws, for example, each of which requires removal before the mirrors can be removed for cleaning. Likewise, each of the small sized screws needs to be fixed in position to fix the mirror within the oven. This arrangement for fixing mirrors in ultraviolet ovens results in extensive machine down time and requires a large number of labor hours to remove and/or replace the mirrors, therefore adding materials to production costs.

Thus, a heretofore unaddressed need exists in the industry to overcome the aforementioned deficiencies and inadequacies.

SUMMARY OF THE INVENTION

The present invention is a removable rack for supporting a reflector in an oven having a light source where the reflector focuses light emitted from the light source in a predetermined manner. The removable rack comprises first and second longitudinal support members in side-by-side spaced relationship, each of the distal support members having a channel therein for receiving a first portion of the reflector. The first and second longitudinal support members comprise first and second ends. First and second base support members are arranged in side-by-side spaced relationship, spaced from and substantially parallel to the longitudinal support members and having first and second ends. Each of the base support members is arranged and configured for receiving a second portion of the reflector. A first end plate is affixed to the distal support members and the base support members at their first ends. A second end plate is affixed to the distal support members and the base support members are their second ends.

First and second cradle feet can be included extending from the first and second end plates in a direction substantially opposite that of the extension of the supports from the first and second end plates, respectively. The first cradle foot and the second cradle foot are both arranged and configured to removably fix the removable rack to the oven so that it can be easily removed.

The present invention also involves a method for removing a reflector disposed in an internal portion of an oven having a light source. The method comprises the steps of providing a removable support rack for releasably supporting at least one reflector and preferably an array of reflectors. The removable support rack is releasably fixed to an interior portion of the oven, and the array of reflectors is replaced by removing the removable support rack from the interior portion of the oven. The array of reflectors are then removed from the rack by removing a portion of the rack. A reflector, or an array of reflectors, can be placed in the oven through reversal operation of the previous steps.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
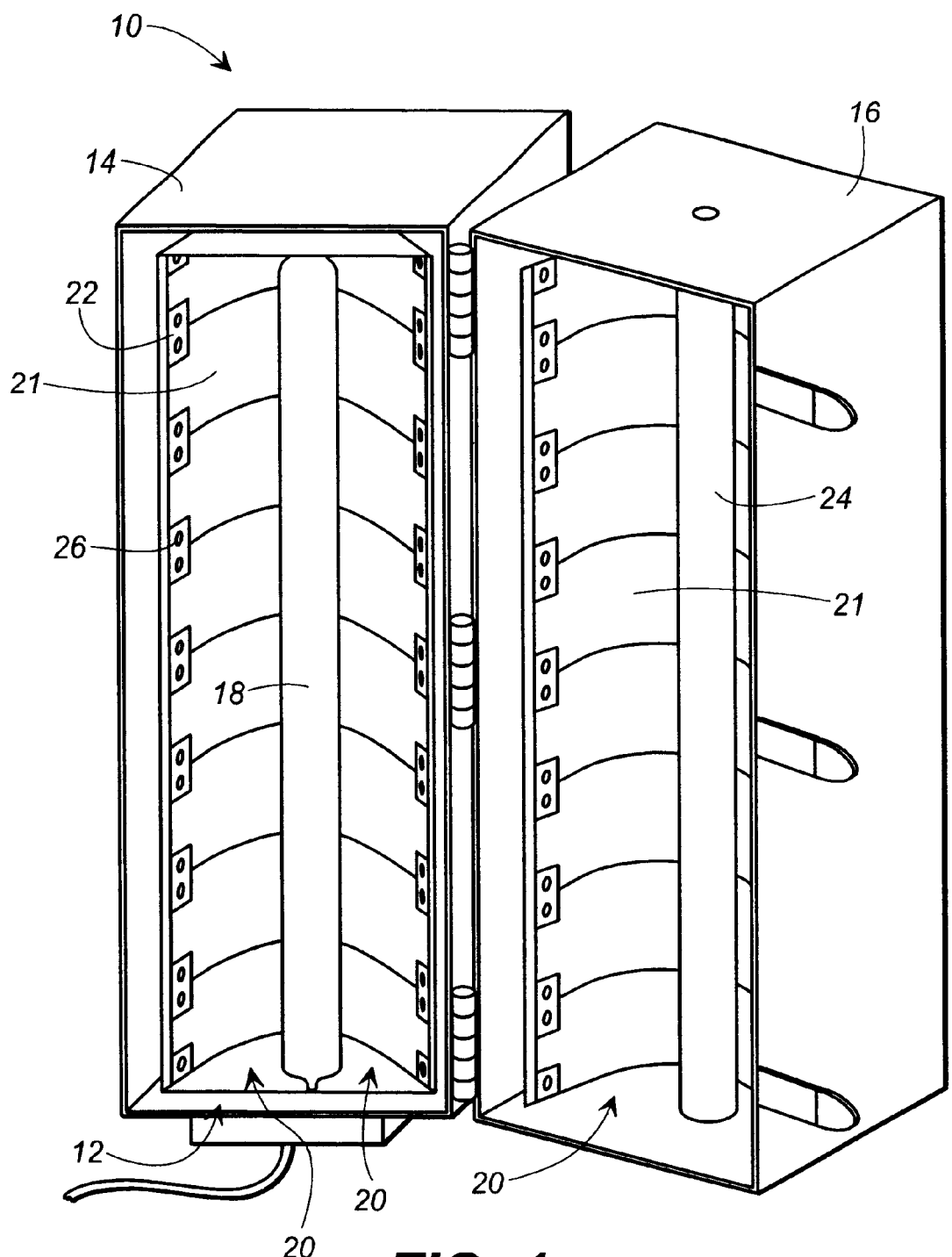
FIG. 1 is a perspective view of a typical ultraviolet curing oven in an open position, exposing the interior of the oven, in which a known prior art mirror rack is installed.

Referring first to FIG. 1, illustrated is a typical ultraviolet curing oven 10 having a known mirror rack 12 installed therein. The ultraviolet curing oven 10 comprises two primary sections, a first section 14 and a second section 16. The first section 14 comprises an ultraviolet bulb 18 surrounded by two mirror arrays 20, where each array 20 preferably comprises mirrors 21 having a substantially arcuate concave profile. Each mirror array 20 is supported within the first section 14 of the ultraviolet curing oven 10 by a mirror rack 12 which is fixed therein. The mirror rack 12 comprises a plurality of mirror brackets 22 for holding each mirror array 20 in its desired position. It is preferable that the pair of mirror arrays 20 are supported by the support rack 12 such as to be disposed in a concave arrangement about the bulb 18 disposed therein. Similarly, the second section 16 of the ultraviolet curing oven 10 comprises a center tube 24 surrounded by a similar pair of mirror arrays 20 held in position by another standard mirror rack 12. Similar to the mirror rack 12 fixed in the first section 14, a plurality of mirror brackets 22 fix the mirrors 21, comprising the mirror arrays 20, in position. In use, the second section 16 of the oven 10 is hingedly closed upon the first section 14 such that the mirror arrays 20 disposed in the first section and the mirror arrays 20 disposed in the second section surround the bulb 18 and the center tube 24. In this arrangement, the mirror arrays 20 focus the ultraviolet light emitted from the bulb 18 toward the center tube 24 inside which a product to be cured, such as an optical fiber, can be positioned. As such, an optical fiber (not shown) needing to be cured (such as a fiber having a wet coating applied thereon), can be passed through the center tube 24 while the mirror arrays 20 focus the ultraviolet light emitted from the bulb 18 thereon, thereby curing the fiber. In the course of regular maintenance, the mirror arrays 20 are periodically removed or replaced for the purposes of cleaning or adjustment. In the known configuration illustrated in FIG. 1, each mirror 21 is individually removed from the oven 10 while the oven 10 is in the open position, such as illustrated in FIG. 1, by loosening fixing members 26 disposed within the mirror brackets 22, which hold each mirror 21 comprising the mirror arrays 20 in position. In a typical configuration, each fixing member 26 comprises a small sized machine screw which can be tedious to handle. As can be seen in FIG. 1, there are typically two fixing members 26 used to hold each individual mirror 21 comprising the mirror array 20 in the desired position. Since each mirror array 20 typically comprises a plurality of individual mirrors 21, this arrangement can result in a relatively high number of fixing members 26 required to hold each mirror array 20 in position. As such, removal of the mirror array 20 for maintenance or any other purpose requires disassembly of the array 20 by disengaging each of the fixing members 24 from the mirror brackets 22. The mirror arrays 20 can then be cleaned and repositioned or replaced with new mirror arrays 20 by positioning each individual mirror 21 that comprises a mirror array 20 in the mirror rack 12 and reaffixing each fixing member 26 to its respective brackets 22 to hold the mirrors 21 in place. It can be seen that replacement of a full set of mirror arrays 20 in a typical ultraviolet curing oven 10, a total of four mirror arrays 20 in the above described arrangement, is time consuming and laborious. Although the ultraviolet curing oven is disclosed herein as accommodating an optical fiber to be cured, it should be noted that such ultraviolet curing ovens can be used in a variety of applications, each of which can benefit from the present invention.

Figure 2:
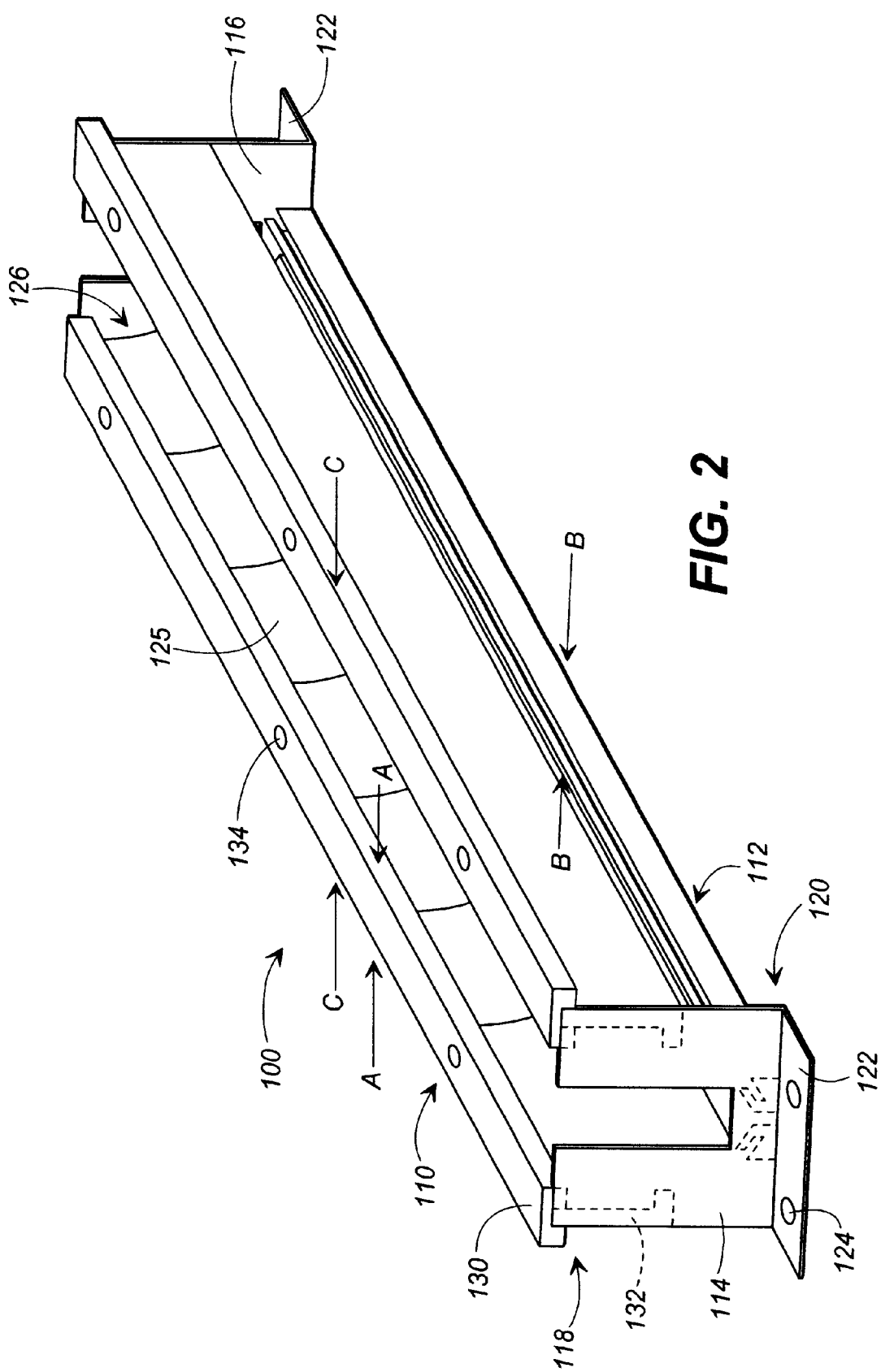
FIG. 2 is a perspective view of a removable support rack of the present invention.
Figure 2A:
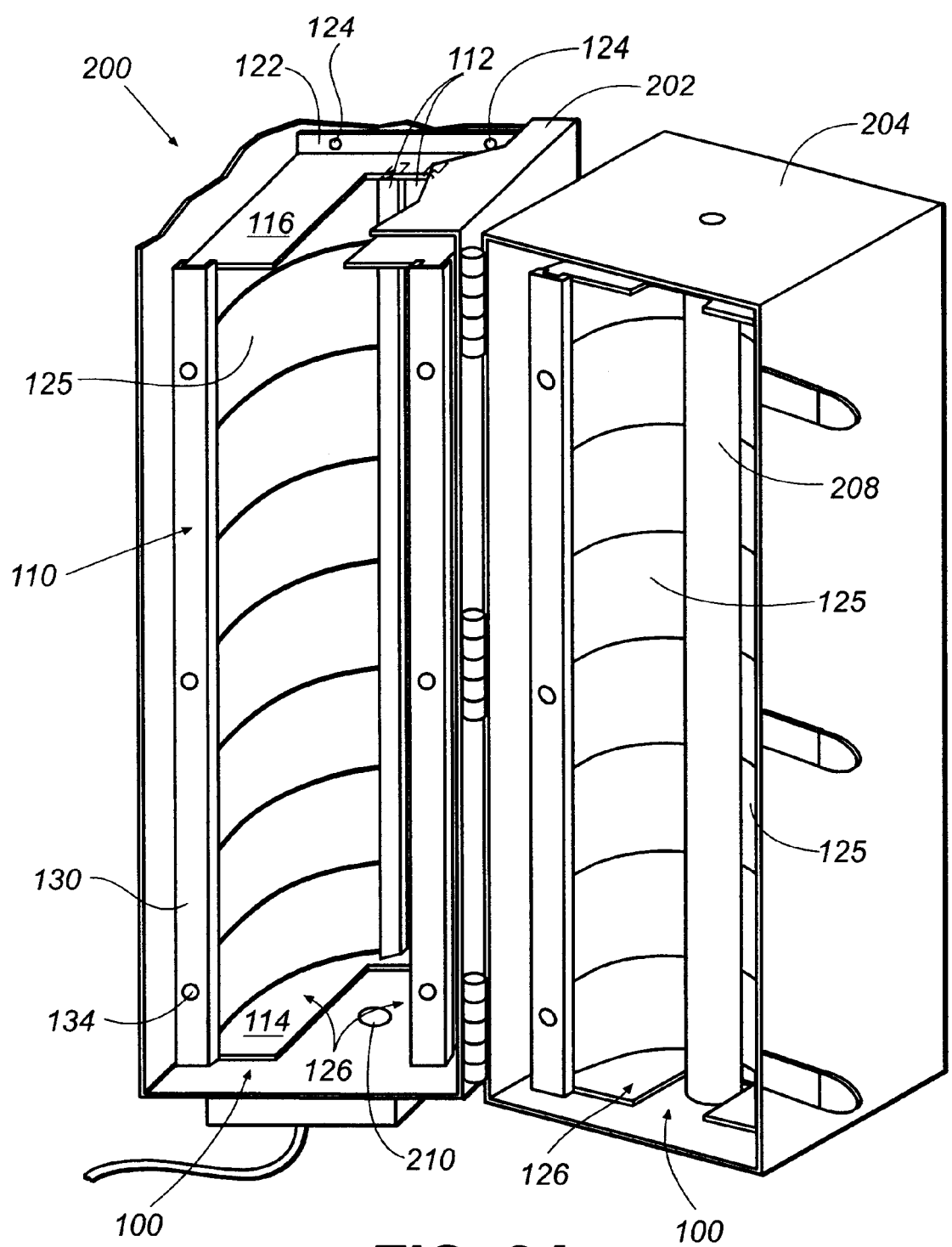
FIG. 2A is a perspective view of an ultraviolet curing oven in an open position, exposing the interior of the oven, in which a removable support rack of the present invention is installed.

Turning next to FIG. 2, illustrated is a preferred embodiment of a removable reflector rack of the present invention, referred to generally with the reference number 100. FIG. 2 illustrates the removable reflector rack 100 oriented in a horizontal position, as opposed to the vertical orientation in which the rack 100 would typically be positioned in use in an ultraviolet oven 10, such as the oven 10 illustrated in FIG. 1. In other embodiments, the removable reflector rack 100 can be used to support a variety of members for a variety of environments where the advantages of the present invention, as described in detail hereinafter, may be utilized. However, for ease of description, the present invention will be described as a removable reflector rack for supporting mirrors in an ultraviolet curing oven. The removable reflector rack 100 comprises a pair of distal supports 110, a pair of base supports 112, a first end plate 114, and a second end plate 116, where the first end plate 114 and the second end plate 116 are disposed and fixed at opposing ends of the distal supports 110 and the base supports 112. The distal supports 110 and the base supports 112 preferably comprise extruded aluminum, however, it should be noted that either or both of the supports 110, 112 can comprise any suitable material that is unaffected by ultraviolet radiation. Likewise, it is preferable that the first end plate 114 and the second end plate 116 comprise stamped-out aluminum, however, it should be further noted that either or both of the end plates 114, 116 also can comprise any suitable material. The first end plate 114 and second end plate 116 can be fixed to the ends of the supports 110, 112 by any suitable manner, such as, for example, by a bolt, a weld, a screw, or the like.

The first end plate 114 and the second end plate 116 preferably comprise a substantially U-shaped planar member having a distal portion 118 and a base portion 120. The first end plate 114 is preferably disposed substantially parallel to the second end plate 116, having the distal supports 110 extending therebetween such that a longitudinal axis thereof is substantially perpendicular to the orientation of the first end plate 114 and the second end plate 116. It is preferable that the longitudinal supports 110 are arranged in a side-by-side spaced relationship and are fixed to the first end plate 114 and the second end plate 116 toward the distal portion 118 of each. Similarly, it is preferable that the base supports 112 are arranged in a side-by-side spaced relationship, spaced from and substantially parallel to the distal supports 110 and disposed between the first end plate 114 and the second end plate 116. It is preferably that the base supports 112 are fixed toward the base portion 120 of each of the first and second end plates 114, 116, such that a longitudinal axis extending through the base supports 112 is substantially parallel to the longitudinal axis extending through the distal supports 110.

The preferred first end plate 114 and preferred second end plate 116 further comprise a cradle foot 122 extending therefrom toward the base portions 120 of the plates 114, 116 and in a direction opposing the extension of the distal supports 110 and the base supports 112 from the first end plate 114 and the second end plate 116, respectively. A preferred cradle foot 122 comprises at least one fixing aperture 124 disposed therein for fixing the movable support rack 100 to an interior portion of an ultraviolet curing oven 10. Although two fixing apertures 124 are illustrated in FIG. 2, it should be understood that the cradle foot 122 can comprise any number of fixing apertures 124 suitable for fixing the removable reflector rack 100 to the housing of an ultraviolet curing oven 200.

Each of the distal supports 110 is arranged and configured to receive an edge of at least one mirror 125, preferably being concave, while each of the base supports 112 is arranged and configured to support an opposing edge of the mirror 125. As such, the removable rack 100 of the present invention preferably supports a pair of mirror arrays 126. A preferred mirror 125 to be supported comprises a portion of a substantially elliptical or circular profile. It is preferable that the removable support rack 100 is arranged and configured to accommodate an ultraviolet bulb (not shown) within the structure of the removable rack 100 such that the preferred pair of mirror arrays 126 supported by the rack 100 are arranged around the bulb in a half circle, half ellipse or the like. The mirror arrays 126 supported by the removable rack 100 can be removed from an ultraviolet curing oven 10 in which they are disposed as one unit by removing the entire removable rack 100 from the interior of the oven 10. The mirror arrays 126 can then in turn be removed from the removable support rack 100 for repositioning or cleaning, as will be discussed next.

Figure 3:
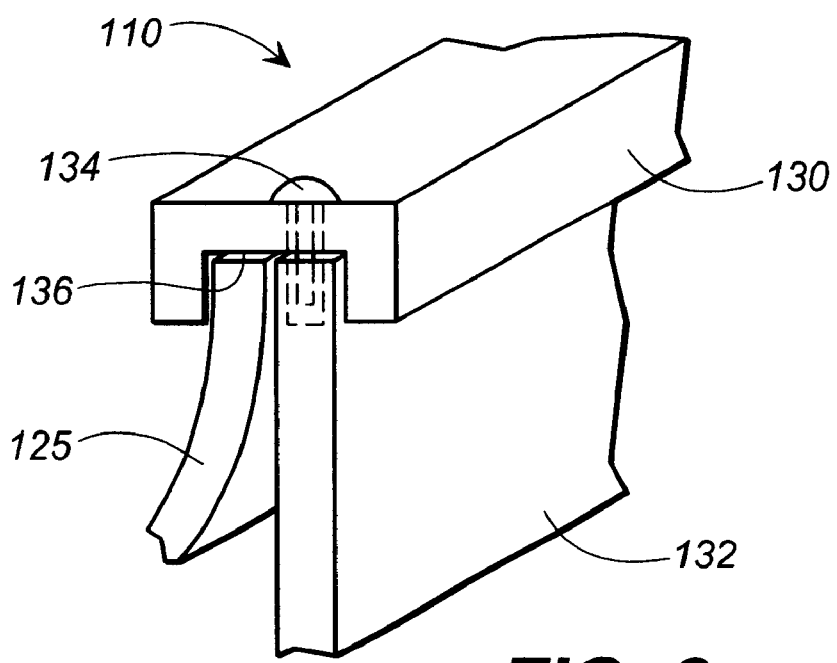
FIG. 3 is a close-up, cut-away, perspective view of the external support of the removable support rack in FIG. 2 taken along line A—A.

FIG. 3 illustrates a cross-section of one of the pair of distal supports 110, taken along the cross-section A—A in FIG. 2. It should be noted that although one of the pair of supports 110 is illustrated and discussed herein, it is preferable that both of the supports 110 are configured substantially similarly. A preferred embodiment of the support 110 comprises a reflector retainer cap rail 130 and a cradle side rail 132. It is preferable that the reflector retainer cap rail 130 comprises an elongated U-shaped member, while the preferred cradle side rail 132 comprises an elongated, substantially planar member. Preferably, a portion of the cradle side rail 132 is seated within a recessed portion 136 of the cap rail 130. A plurality of fixing members 134 are preferably used to fix the cradle side rail 132 into place with respect to the cap rail 130. Although three fixing members 134 are illustrated, it should be understood that any number of fixing members can be included that is sufficient to hold the cap rail 130 in position. However, it should further be noted that it is preferred that there be less than two fixing members 134 for each mirror 125. The distal support 110 is arranged and configured such that an edge of the mirror 125 is seated within the recessed portion 136 of the cap rail 130 substantially adjacent the cradle side rail 132 seated therein. It is preferable that the recessed portion 136 is arranged and configured to receive the mirror 125 in a "free-floating" manner, such as to provide space for thermal expansion as the mirror 125, as well as the rack 100 itself, encounters the ultraviolet radiation while the oven 10 is in use. As such, the edge of the mirror 125 engaged by the distal support 110 is substantially free upon removal of the fixing member 134 and detaching the cradle side rail 132 from the recessed support 136. It is preferable that the distal support 110 engages a plurality of mirrors 128 comprising a mirror array 126. As such, the removal of the cradle side rail 132, which extends the length of the rack 100, facilitates quick and easy removal of the entire mirror array 126. Similarly, an entire mirror array 126 can be fixed into place in the removable support rack 100 upon attaching the reflector retainer cap rail 130 and fixing it into position with the fixing members 134.

Figure 4:
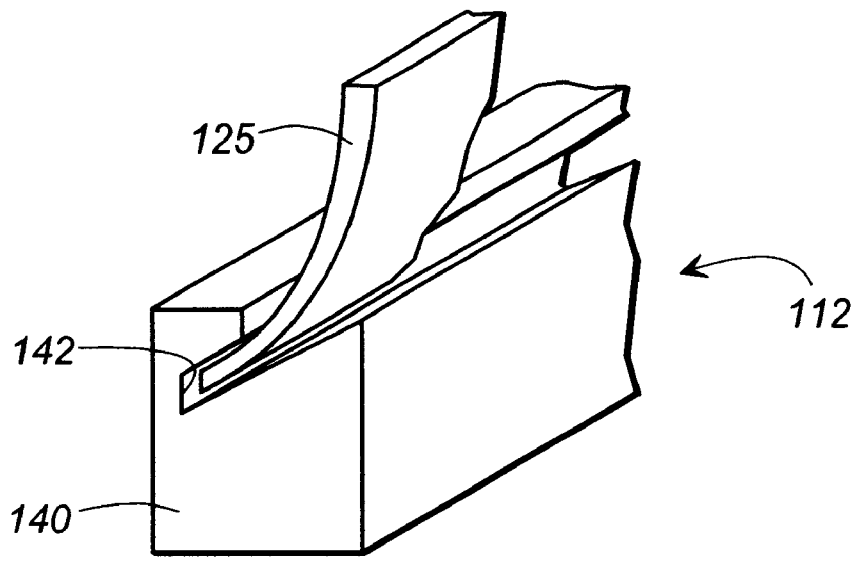
FIG. 4 is a close-up, cut-away, perspective view of the base support of the removable support rack in FIG. 2 taken along line B—B.
Figure 5:
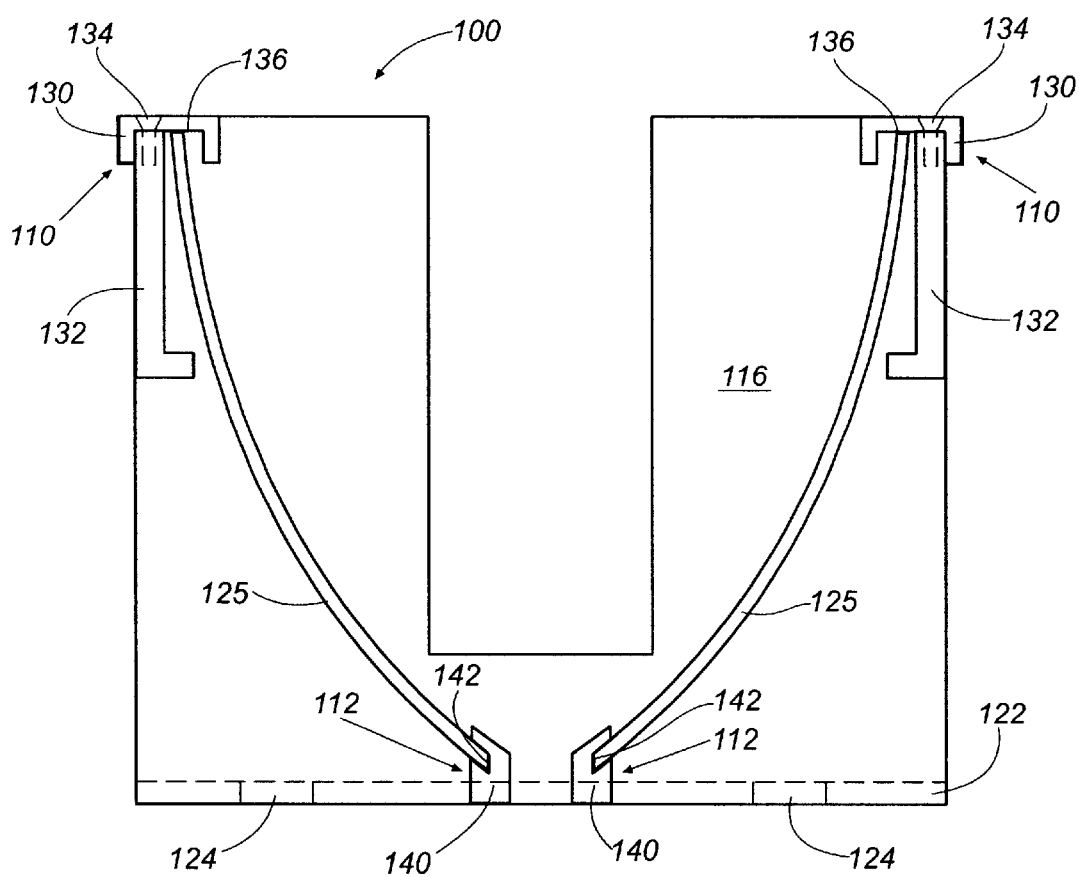
FIG. 5 is a full cross section view of the removable support rack of the present invention illustrated in FIG. 2 taken along line C—C.

FIG. 4 illustrates a cross-section of one of the pair of base supports 112 taken along the line B—B in FIG. 2. It should be noted that although one of the pair of base supports 112 is illustrated and discussed herein, it is preferable that both of the base supports 112 are substantially similar in configuration. It is preferred that the base support 112 comprises a reflector bottom support 140 being substantially elongated and extending from the first end plate 114 and the second end plate 116 and fixed thereto. The preferred reflector bottom support 140 comprises a receiving notch 142 disposed therein and positioned at a defined angle to accommodate the preferred curvature of the mirror 125 to be supported therein. Since the mirror 125 can be slid in and out of receiving notch 142 and is preferably not fixed therein by additional means. Since a portion of each mirror 125 readily received and released by the receiving notch 142 disposed in the base support 112, easy removal and replacement of the mirror 125 is provided for by removal and replacement of the reflector retainer cap rail 130. It should be further noted that it is preferable that the receiving notch 142 to accommodate the mirror 125 such that the mirror 125 is engaged thereby in a "free-floating" manner to allow for thermal expansion.

The present invention also provides a method for removal and replacement of arrays of reflectors, such as mirror arrays 126 used in an ultraviolet curing oven 10. Referring back to FIG. 2, it can be seen that a preferred removable reflector rack 100 supports a pair of mirror arrays 126. In the preferred method for removal of the mirror arrays 126 from an interior portion of an oven 10, a removable reflector rack 100 of the present invention is provided and removably fixed to an interior portion of an ultraviolet curing oven 10. Fixing members (not shown), comprising screws, bolts, clamps, or any suitable member fixing the rack 100 in the oven 10, are disengaged and the entire rack 100 is removed from the interior of the oven 10. To remove the mirror arrays 126 from the rack 100 itself, the reflector rail cap 130 is disengaged from the cradle side rail 132 upon disengaging fixing members 134 used to hold the reflector rail cap 130 thereon. An edge of each of the mirrors 125 making up the mirror array 126 can be disengaged from the notch 142 disposed in a portion of the base support 112 and the desired mirror 125. The mirrors 125 can be cleaned and placed back into the rack 100 or new mirrors can be disposed therein. The present invention is also a method for disposing a mirror 125 or a plurality of mirrors 125, comprising one or more mirror arrays 126, in an ultraviolet curing oven 10. While the removable reflector rack 100 is outside of the oven 10 in which it will be used, a preferred plurality of mirrors 125 can be disposed in the rack 100 substantially adjacent each other, comprising a mirror array 126, first by sliding an edge of each mirror 125 into the receiving notch 142 of each base support 112. The cap rails 30, corresponding to each of the distal supports 110 can then be fixed in place to the cradle side rail 132, thereby fixing the mirror arrays 120 into place. The two mirror arrays 126 can be fixed in the oven 10 by positioning and fixing the entire rack 100 in the oven 10. The rack 100 can then by fixed to a portion of the oven 10 by engaging fixing members (not shown) at the fixing apertures 124 disposed in each cradle foot 122.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention.

What is claimed is:

1. A removable rack for supporting a reflector in an oven having a light source, wherein the reflector focuses light emitted from the light source in a predetermined manner, said removable rack comprising:

first and second longitudinal support members in side-by-side spaced relationship, each of said longitudinal support members having a channel therein for receiving a first portion of the reflector, said first and second longitudinal support members having first and second ends;

first and second base support members in side-by-side spaced relationship, spaced from and substantially parallel to said longitudinal support members and having first and second ends, each of said base support members being arranged and configured for receiving a second portion of the reflector;

a first end plate affixed to said longitudinal support members and said base support members at their first ends; and a second end plate affixed to said longitudinal support members and said base support members are their second ends.

2. The removable rack of claim 1, wherein each of said first and second longitudinal support members comprises:

a reflector retainer cap having said channel therein extending between said first and second ends of said longitudinal support members;

a cradle side rail having an upper surface extending into said channel to provide support for said retainer cap which is removable therefrom;

said cradle side rail extending between said first and second ends of said longitudinal support members and being affixed to each of said end plates at said first and second ends.

3. The removable rack of claim 2, wherein said reflector retainer cap is disposed substantially perpendicular to said cradle side rail.

4. The removable rack of claim 2, wherein said reflector retainer cap receives the reflector in a free floating manner.

5. The removable rack of claim 1, wherein each of said first and second end plates comprises:

a cradle foot extending from said plate in a direction opposing the extension of said first and second longitudinal support members and said first and second base support members;

wherein said cradle foot being arranged and configured to fix said removable rack to the oven such that said removable rack is removable.

6. The removable rack of claim 5, wherein said cradle foot comprises an aperture disposed therethrough for fixing said removable rack to a portion of the oven.

7. The removable rack of claim 1, wherein each of said first and second base support members comprise:

a reflector bottom support, said reflector bottom support having a receiving notch disposed in a portion of said reflector bottom support at a defined angle, wherein said receiving notch is arranged and configured to receive a second portion of the reflector, said second portion opposing said first portion of the reflector.

8. The removable rack of claim 1, wherein said reflector comprises a mirror having a substantially parabolic profile.

9. The removable rack of claim 1, wherein said reflector comprises a mirror having a substantially circular profile.

10. The removable rack of claim 1, wherein each of said first and second longitudinal support members comprises an aluminum extrusion.

11. The removable rack of claim 1, wherein each of said first and second base support members comprises an aluminum extrusion.

12. The removable rack of claim 1, wherein the oven having a light source comprises an ultraviolet curing oven.

13. The removable rack of claim 1, wherein said removable rack supports a plurality of reflectors.

14. An ultraviolet curing oven having a first section and a second section, wherein the second section being hingedly fixed to the first section, said oven comprising:

a first reflective means, said first reflective means being arranged and configured to focus light emitted within the oven;

a second reflective means, said second reflective means being arranged and configured to focus light emitted within the oven;

a first removable support means, said removable support means being arranged and configured to support said first reflective means and said second reflective means;

said first removable support means further comprising:

a pair of longitudinal support means, one of said pair of longitudinal support means being arranged and configured to releasably engage a first portion of said first reflective means and the other of said pair of longitudinal support means being arranged and configured to releasably engage a first portion of said second reflective means, respectively;

a pair of base support means, one of said pair of base support means being arranged and configured to releasably engage a second portion of the first reflective means and the other of said pair of base support means being arranged and configured to releasably engage a second portion of said second reflective means;

a fixing means for removably fixing said first removable support means to the oven;

wherein said pair of longitudinal support means and said pair of base support means being fixed at opposing ends thereof by a first end plate and a second end plate; and wherein said first reflective means is removable from said support means upon disengaging one of said pair of said longitudinal support means and said second reflective means is removable from said support means upon disengaging the other of said pair of said longitudinal support means.

15. A method for replacing a reflector from an interior portion of an oven having a light source, said method comprising the steps of:

provided a removable support rack for releasably supporting the reflector within the oven, wherein said removable rack being releasably fixed to an interior portion of the oven;

providing a longitudinal support and a base support, wherein said longitudinal support and said base support are arranged and configured to receive opposing edges of the reflector;

removing a member fixing said removable support rack to the interior portion of the oven;

removing said removable support rack from the interior portion of the oven, wherein the reflector remains releasably supported within said removable support rack;

disengaging a portion of said longitudinal support, thereby releasing an edge of the reflector; and removing the reflector from said removable support rack.

16. The method of claim 15, further comprising the steps of:

placing a second reflector in said removable support rack;

engaging a portion of said longitudinal support thereby releasably supporting the second reflector;

disposing said removable support rack within the oven; and fixing said removable support rack within the oven.

* * * * *